Dec. 15, 1959    R. L. COBB ET AL    2,917,495
PREPARATION OF HYDROGENATED POLYMERS
Filed March 11, 1957
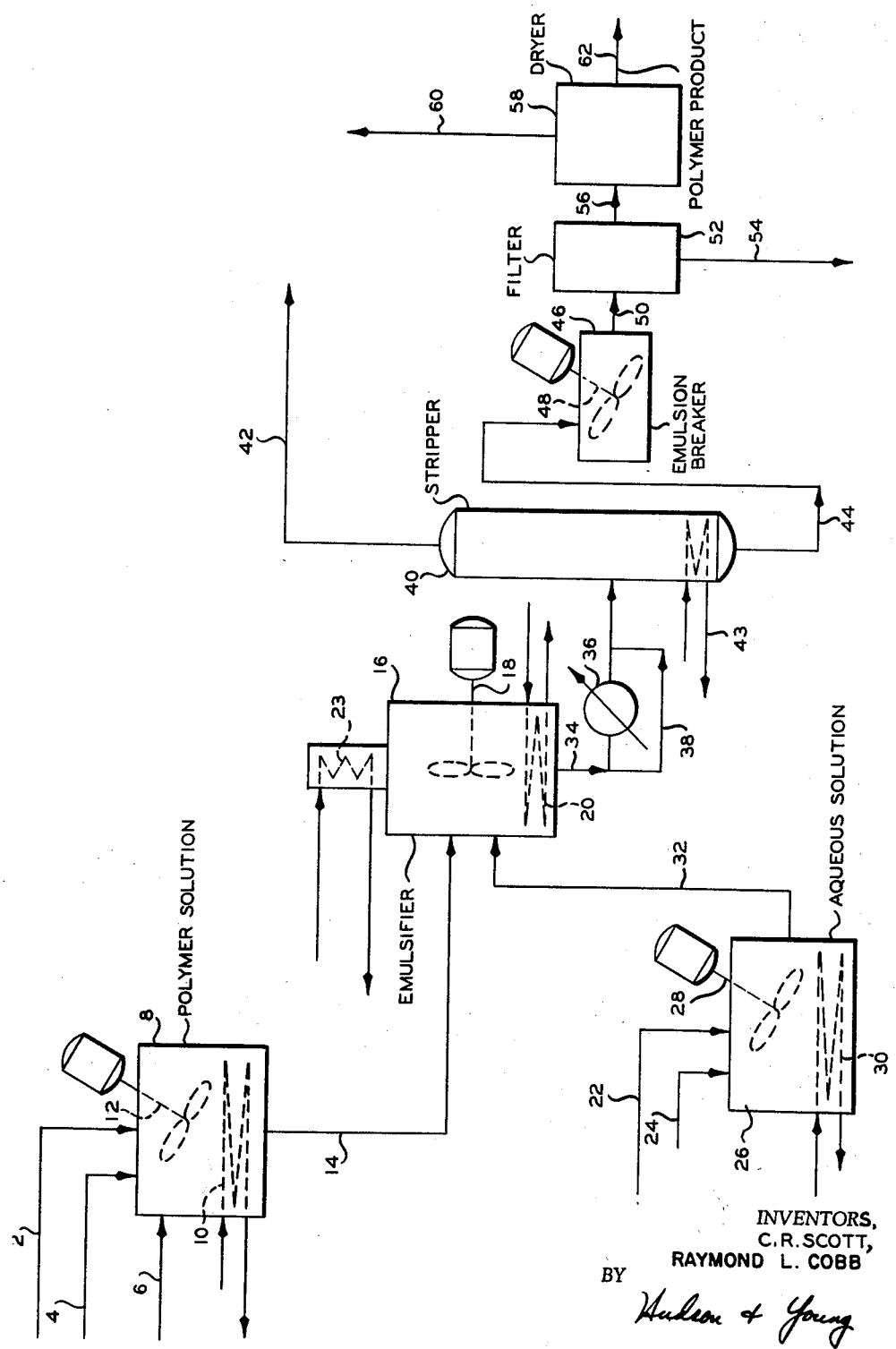
INVENTORS,
C. R. SCOTT,
RAYMOND L. COBB
BY
*Hudson & Young*
ATTORNEYS

United States Patent Office 2,917,495
Patented Dec. 15, 1959

2,917,495
PREPARATION OF HYDROGENATED POLYMERS

Raymond L. Cobb, Bartlesville, Okla., and Cleveland Rex Scott, East Providence, R.I., assignors to Phillips Petroleum Company, a corporation of Delaware Application March 11, 1957, Serial No. 645,376

10 Claims. (Cl. 260—85.1)

This invention relates to a method for the preparation of hydrogenated rubbery polymers in a finely subdivided form. In one aspect, the invention relates to the preparation of rubbery polybutadienes having a small uniform particle size.

It is an object of this invention to provide hydrogenated rubbery polymers in a more desirable form.

Another object of this invention is to provide an improved method for the preparation of finely sub-divided hydrogenated rubbery polymers.

Still another object of this invention is to provide an improved method for the preparation of hydrogenated polymers of butadienes and copolymers of butadiene and styrene having a small uniform particle size.

These and other objects of the invention will become more readily apparent from the following detailed description and discussion.

The foregoing objects are achieved broadly by dissolving a hydrogenated rubbery polymer in a solvent, emulsifying the resulting solution with water and an emulsifying agent, removing the solvent from the emulsion by vaporization and breaking the emulsion by introducing the emulsion into a water-soluble polar organic precipitating agent with a minimum of agitation.

In one aspect of the invention, the emulsion is broken by introducing the emulsion onto the surface of water-soluble polar organic precipitating agent with a minimum of agitation.

This process is applicable for producing small particle hydrogenated polymer in the size range of between about 1 and about 20 microns from hydrogenated rubbery polymers containing from 0 to 50 and preferably from 0 to 20 percent unsaturation based on 100 percent theoretical unsaturation for the unhydrogenated rubbery polymer.

The polymers treated in the method of this invention are selected from homopolymers of dienes and copolymers of styrene and butadiene, using not over about 30 parts of styrene by weight. The polymers are prepared by emulsion polymerization at a temperature of 5 to 140° F. and preferably at a temperature within the range of 20 to 60° F. A very good balance of polymer properties is obtained by polymerizing butadiene at a temperature of about 41° F.

Hydrogenation of the polymers is carried out in the presence of a hydrogenation catalyst such as, for example, nickel, kieselguhr, Raney nickel, copper chromite, molybdenum sulfide, metallic platinum, palladium, etc. at elevated temperatures, preferably in the range of 300 to 600° F. and at pressures up to 3000 p.s.i.g. Preferably nickel kieselguhr is used as the catalyst and the reaction is carried out over a time period in the range of 1 to 24 hours, and preferably between about 2 and about 8 hours.

For a more detailed discussion of the polymers and the methods for hydrogenating same, reference is had to the copending application of R. V. Jones, Serial No. 395,291, filed November 30, 1953, now Patent No. 2,864,809.

In carrying out the process of this invention, the first step comprises dissolving the hydrogenated rubbery polymer in a solvent material. The preferred solvents for this purpose are those boiling in the range between about 50 and about 150° C.; however any solvent that can be satisfactorily removed from subsequently formed emulsions without causing softening of the rubbery polymer can be employed. Since the solvent is removed from the rubbery polymer-water solvent emulsion in a later stage, usually by vaporization, solvents which form minimum boiling azeotropes with water are particularly suitable. Typical solvents which can be employed in the process are cyclohexane, methylcyclohexane, benzene, toluene, isooctane and carbon tetrachloride. It is preferred that sufficient solvent be employed to provide a solution containing about 10 percent polymer by weight or less. However, if desired, solutions of higher polymer concentration can be employed.

Emulsification of the rubbery polymer solution is carried out in the presence of water and an emulsifying agent. It is desirable that the water be present in an amount comprising at least 30 percent by weight of the solution of hydrogenated rubbery polymer and a preferred upper limit for the amount of water to be used is about 5 times the quantity of water by weight as the polymer solution present. In any case, it is desirable that sufficient water be present to establish a continuous water phase. As in the case of the solvent material employed, it is necessary to effect separation of the water from the final polymer product. Therefore, although larger amounts of water can be used, it is desirable that the operation be carried out with the minimum quantity of water which is feasible. The emulsification process is carried out by agitating the mixture of polymer solution, water and emulsifying agent, the desired agitation being provided in any conventional manner, such as, by stirring or other conventional means. It is necessary in order to obtain the desired end product that the emulsification step be carried out at a temperature below the softening point of the hydrogenated rubbery polymer. A suitable temperature usually lies in the range of from about 160° F. to about 180° F.

The emulsifying agents used in this portion of the process comprise in general oil soluble emulsifying agents, examples of which include fatty acid esters of polyhydric alcohols or of ether alcohols, for example, glycerol mono-stearate; esters of ethylene glycol, di- and tri-ethylene glycol and polyethylene glycol, for example, the condensation product of oleic acid with 6 mols of ethylene oxide; fatty esters of sugar alcohols; alkyl urethans; fatty amides of monoethanolamines; fatty nitriles and fatty acid amides, such as oleic morpholide. The emulsifying agent used can be added to either the polymer solution or the water, or it can be formed during the emulsifying step. As an example of the latter type of operation, morpholine is added to the water, oleic acid is dissolved in the polymer solution and the two phases are then brought into contact to form a fatty acid morpholide emulsifying agent in admixture with water and the hydrogenated rubbery polymer.

The amount of emulsifier employed is generally at least about 5 parts by weight per 100 parts by weight of rubbery hydrogenated polymer solution. However, the amount will vary depending on the particular emulsifier employed and the particular polymer to be emulsified.

After the emulsion is prepared, the solvent is removed therefrom by vaporization. Various methods can be employed for carrying out this operation, such as stripping, distillation, etc. A suitable method for removing the solvent is to distill off this material from the emulsion while simultaneously stirring or agitating the liquid. The solvent removal step also is carried out below the softening point of the hydrogenated rubbery polymer. The temperature of this operation can be kept at a minimum boiling azeotrope with water, or by reducing the pressure under which distillation or stripping is carried out, or by a combination of the two methods. The latter method, namely reduction of pressure, is particularly desirable in that it serves to increase the relative volatility of the solvent, since the vapor pressure of water does not change rapidly with changes in pressure.

Following the solvent removal operation, the polymer-water emulsion is broken, to precipitate the polymer in the form of the desired small uniform particles. It has been found preferable to perform this operation at substantially normal atmospheric temperatures, that is, about 60 to 80° F. Thus, if the solvent removal operation is carried out at a temperature above this, it is desirable that emulsion be allowed to cool or be cooled to atmospheric temperature before proceeding with the breaking operation.

It has been found that the degree of sub-division of the product polymer is dependent to a great extent on the amount of agitation which occurs during the emulsion breaking operation. Thus it has been found desirable to introduce the emulsion into or onto the surface of the emulsion breaking or precipitating agent and this operation should be performed with a minimum of agitation. The dispersion which results is then allowed to stand for several seconds, usually at least five seconds, after which the solution can be agitated to effect complete dispersion of the polymer in the precipitating agent-water mixture.

Suitable precipitating agents which can be used in this operation include alkyl alcohols and alkyl ketones, the alkyl group containing up to five carbon atoms in the alcohols and up to three carbon atoms in the ketones, such as methanol, ethanol, propanol, isopropanol, butanol, isobutanol, pentanol, etc., and ketones such as acetone, methyl ethyl ketone, diethyl ketone, methyl propyl ketone, methyl isopropyl ketone, etc. Another group of precipitating agents are the amines such as pyridine and alkylamines containing up to five carbon atoms, including diethylamine, propylamine, isopropylamine, dipropylamine, butylamine, dibutylamine, tertiary-butylamine, secondary-butylamine, amylamine, isoamylamine, tertiary-amylamine, etc. The amount of precipitating agent used usually is between about 5 and about 10 parts by weight per part by weight of water present in the water-polymer emulsion. If desired, however, greater quantities of precipitating agent can be used.

Following the emusion breaking step, the dispersed polymer particles are recovered by a suitable separation means, such as by filtration, followed by a conventional drying operation.

The small particle hydrogenated rubbery polymer prepared by the method of this invention finds use particularly as a molding powder. Since the hydrogenated rubbery polymers are thermoplastic in nature, molds can be easily filled with the small particle material and heated to form a molded object. If desired, small amounts of such filler materials as gelatin and talc can be added to the water prior to emulsifying the water with the hydrogenated polymer solution.

In order to more fully described the invention and provide a better understanding thereof, reference is had to the accompanying drawing which is a diagrammatic illustration in cross-section of apparatus suitable for carrying out the method of the invention. Referring to the drawing, a hydrogenated rubbery polymer, such as polybutadiene, is introduced to polymer solution vessel 8, through conduit 2. Simultaneously, a hydrocarbon solvent, for example, cyclohexane, and a fatty acid morpholide emulsifying agent are introduced to the same vessel through conduits 4 and 6, respectively. The polymer solution vessel is equipped with a stirrer 12 to agitate the mixture and is also provided with a steam heating coil 10 so that the temperature within this vessel can be maintained at the desired level. When the polymer is placed in solution, a mixture of polymer in solution and emulsifying agent is removed from the bottom of vessel 8 through conduit 14 and introduced to emulsifier 16. At the same time, water is also introduced to the emulsifier through conduit 32. The latter vessel is also equipped with a mixer 18 and a steam coil 20 for suitably agitating the mixture contained therein and providing the desired emulsifying temperature. In the event that the temperature employed in the emulsifier approaches the vaporization temperature of the solvent, a cooling coil 23 is provided in the upper portion of the emulsifier to condense such solvent, which is then returned to the emulsion. Emulsion is withdrawn from the emulsifier through conduit 34 and passed through cooler 36 wherein the temperature is reduced to substantially atmospheric. Following this, the emulsion is introduced to stripper 40. Control of the temperature of the material in the stripper is provided by a by-pass 38 around cooler 36. In the event that the emulsification is carried out at atmospheric temperature, the entire emulsion yielded from this vessel can be by-passed through conduit 38. The temperature in stripper 40 is elevated to a sufficient level by steam introduced to reboiler 43 whereby the solvent cyclohexane is vaporized from the emulsion, said solvent passing overhead from the stripper through conduit 42. The remaining emulsion, now comprising polymer and water, passes from the bottom of stripper through conduit 44 and is introduced to emulsion breaker 46, being flowed onto the surface of a liquid precipitating agent maintained therein. After a several seconds delay, precipitated hydrogenated rubbery polymer is dispersed in the emulsion breaker by means of stirrer 48. Since a time delay before the dispersion step is desirable, emulsion breaking 46 in a continuous operation, comprises a plurality of emulsion breaking vessels.

A slurry of finely sub-divided hydrogenated polymer in water and emulsion breaking agent, is passed from vessel 46 through conduit 50 to filter 52 wherein the polymer particles are filtered from the liquid, the latter material being discharged from the filter through conduit 54. The particles of rubbery polymer containing residual water and emulsion breaker are then passed through conduit 56 and dryer 58, emerging therefrom through conduit 62 as dry product. The residual water and emulsion breaker exit from the drier via conduit 60 for further treatment as desired.

Although the method illustrated by the accompanying drawing represents the preferred embodiment of the invention, it is not intended that it be taken in any limiting sense and that other operating steps and procedures can be used within the scope of the invention. Thus, for example, referring to the figure, if it is desired to form an oil soluble emulsifying agent in situ, such as, for example by the reaction of morpholine and oleic acid to form a fatty acid morpholide, this can be accomplished by introducing the oleic acid to the polymer solution tank 8, and by dissolving morpholine in water in aqueous solution tank 26, the latter materials being introduced to tank 26 through conduits 22 and 24 respectively. The desired emulsion is obtained when the polymer solution and aqueous solution of morpholine are introduced to the emulsifier through conduits 14 and 32, respectively.

As previously stated, removal of the solvent by vaporization can be effected in any conventional manner, as can also the steps of filtration and drying to provide the final finely divided uniform polymer product.

The following examples are presented as illustrative of the process of this invention.

EXAMPLE I

Hydrogenated rubbery polybutadiene of small particle size was prepared by the following procedure.

Rubbery polybutadiene was prepared by emulsion polymerization according to the following recipe.

Polymerization Recipe

| Ingredient: | Parts by weight |
|---|---|
| Water | 200 |
| Methanol rinse | [1] 0.25 |
| Butadiene (1,3-) | 100 |
| Potassium salt of disproportionated rosin | 5.0 |
| KOH | [1] 0.10 |
| KCl | 0.50 |
| Sodium salt of condensed alkylaryl sulfonic acid | 0.10 |
| $FeSO_4 \cdot 7H_2O$ | 0.02 |
| Ethylenediaminetetracetic acid | 0.04 |
| Sodium formaldehyde sulfoxylate dihydrate | 0.10 |
| Cumene hydroperoxide | 0.10 |
| Tert-dodecyl mercaptan | See table below |
| Shortstop | 0.30 |
| Antioxidant (parts/hundred parts of rubber) | 1.0 |

[1] Three runs were made using the above recipe. Runs 2 and 3 contained (as ingredients) the amounts of methanol (as rinse) and KOH shown above. Run 1 contained as an ingredient 0.30 part methanol (as rinse) and 0.03 part KOH on the same basis as given above.

Polymerization data

| Run No. | Parts by Weight Tert-Dodecyl Mercaptan | Polymerization Temp., °F. | Polymerization Temp. | Conversion, Percent | Mooney Viscosity After Venting (ML-4) |
|---|---|---|---|---|---|
| 1 | 0.48 | 41 | 16 | 59 | 18 |
| 2 | 0.48 | 41 | 14.1 | 60 | 18 |
| 3 | 0.42 | 41 | 21 | 61 | 25 |

A blend of latex containing 32.8 weight percent of latex from run 1, 35.6 weight percent of latex from run 2, and 31.6 weight percent of latex from run 3 was then made up. This latex blend was then shock coagulated by adding it to isopropyl alcohol. The serum was then drained, and the crumb was given three 15-minute water washes at 130° F. (The Mooney viscosity of this polymer was 20 (ML—4).)

The polybutadiene rubber, prepared as described above, was hydrogenated by the following procedure. Seventy-six grams of nickel-kieselguhr catalyst, prepared by reducing nickel hydroxide impregnated kieselguhr in hydrogen at 775° F. for 4 hours, was rinsed into the hydrogenation reactor with 2 liters of methylcyclohexane. The reactor temperature was then raised to 300° F., and a solution of 800 grams of the rubbery polybutadiene dissolved in 7 liters of methylcyclohexane was pumped into the reactor. This charge was followed by rinse of 2 liters of methylcyclohexane. The reactor was then heated to 450° F., and hydrogen was pressured into the reactor until the pressure reached 500 p.s.i.g. The hydrogenation reaction was carried out for 3 hours, during which time the hydrogen feed was adjusted to maintain the reactor at 500 p.s.i.g. At the end of 3 hours, the reactor contents were blown down into methylcyclohexane, yielding a solution of hydrogenated rubbery polybutadiene which contained approximately 4 percent by weight hydrogenated polymer. The solution was then centrifuged and passed between the coils of a magnet, these two steps serving to remove the catalyst present. A sample of the solution was evaporated to recover the hydrogenated polymer, and this hydrogenated polymer was found to contain approximately 8 percent unsaturation based on the original unsaturation.

A number of hydrogenation runs were made, using essentially the same procedure as given above in which the above described rubbery polybutadiene was hydrogenated. The solutions of hydrogenated polymer in methylcyclohexane from seven different hydrogenation runs were blended to yield a solution of hydrogenated rubbery polybutadiene in methylcyclohexane which contained approximately 4 percent by weight of the hydrogenated polymer. The hydrogenated polymer in this blended solution contained approximately 7–8 percent unsaturation based on the unsaturation present in the original polybutadiene rubber.

The hydrogenated rubbery polybutadiene present in the above described solution was precipitated in the form of very fine particles by the following procedure.

Two hundred fifty cubic centimeters of water and four grams of morpholine were combined and heated to about 90° C. Four grams of oleic acid and one hundred grams of the above-described solution of hydrogenated rubbery polybutadiene in methylcyclohexane were mixed and heated until complete solution was effected, after which this solution was added to the aqueous solution of morpholine. The resulting mixture was stirred at the reflux temperature of the methylcyclohexane-water azeotrope (81° C.) for 15 minutes. This was carried out in a flask which was fitted with a reflux condenser so that the methylcyclohexane and water which was evaporated was condensed and returned to the flask. The emulsion resulting was then placed under a partial vacuum, and gradually decreasing temperature (starting at 81° C.) and continuous stirring, the methylcyclohexane was stripped off. The majority of the methylcyclohexane distilled off between 65 and 80° C. After about two hours, the resulting emulsion was cooled to room temperature and broken by pouring in several increments into three liters of methyl alcohol. The hydrogenated polymer precipitated as fine particle. After about ten seconds, the solution was stirred and the solid product was filtered out of the methanol-methylcyclohexane mixture, washed three times with methanol, and dried. The yield of small particle hydrogenated rubbery polybutadiene was 1.9 grams of a powder which consisted largely of spherical particles in the particle size range between two and ten microns.

EXAMPLE II

Three hundred grams of the solution of hydrogenated rubbery polybutadiene in methylcyclohexane, identical to the polymer solution prepared in Example I was treated in the following manner. One hundred eighty grams of the methylcyclohexane was stripped off of this polymer solution, yielding a rather viscous lacquer. Four grams of morpholine and four grams of oleic acid were then added to the viscous lacquer, after which this viscous lacquer was heated to about 75° C. Two hundred fifty cubic centimeters of water, previously heated to 75° C. was then added with vigorous stirring. The first fifty to seventy-five cubic centimeters of water was added very slowly, and the remainder was poured in quite rapidly. The mixture was stirred rapidly for an additional five minutes, after which the rate of stirring was decreased to the minimum speed of a standard laboratory stirring device. The resulting emulsion was then placed under vacuum, and solvent was evaporated for about six hours. During this evaporation, the temperature was maintained at 50–60° C. after the initial drop from 75° C. when the pressure was reduced to strip off the solvent. The emulsion was then stirred very slowly overnight at room temperature, after which the emulsion was broken by pouring into six liters of methanol, using the same procedure described in Example I. The precipitated solid polymer was a fine white powder weighing 9.5 grams. A microscopic examination of the product proved the product to be in the form of round particles, the majority of which were in the particle size range between four and ten microns.

EXAMPLE III

Two grams of morpholine and 0.5 gram of talc were added to two hundred fifty cubic centimeters of water, after which the mixture was heated to 90° C. with stirring to disperse the talc. One hundred grams of a solution of hydrogenated rubbery polybutadiene in methylcyclohexane (identical to the solution of Example I) was heated to about 70° C., after which two grams of oleic acid was added to the mixture. This polymer solution was then added to the solution of morpholine and talc in water with stirring. An additional two grams of morpholine and two grams of oleic acid were added to the resulting mixture, and this mixture was then heated under refluxing conditions (81° C.). This heating was carried out with vigorous stirring for fifteen minutes. After this step, the emulsion was cooled gradually with moderate stirring to 50° C. after which the methylcyclohexane was stripped off under vacuum. This stripping was carried out within the temperature range of from 40-60° C. The emulsion, after cooling to room temperature, was divided into two approximately equal portions. One portion was divided into three aliquots. One of these aliquots was poured onto saturated sodium chloride solution, and a crumb of coagulated polymer resulted. The second aliquot was poured onto acetone, and very small particles of polymer precipitated. The third aliquot was divided in half, and half was poured into a large excess of methanol by the method of Example I. This method gave small particles of precipitated polymer. A portion of the second half was tested by pouring methanol into the portion. This resulted in a coagulated crumb-like polymer. The remainder of the second half was precipitated by pouring into approximately two liters of methanol, and small particles of precipitated polymer resulted. The product from this test was a fine white powder, and each particle was shown to be approximately spherical in shape when analyzed with a microscope.

It is to be noted that in Examples I, II, and III that when the emulsion of rubbery polymer in water was poured into methanol with a minimum of agitation, small particles of precipitated polymer in a size range of 2 to 10 microns were obtained. With reference to Example III, it is to be noted that the use of sodium chloride as a precipitating agent provided a crumb of coagulated polymer rather than the finely sub-divided particles of this invention. It is also to be noted that in Example III, a coagulated crumb-like polymer resulted when methanol was poured into the polymer in water emulsion.

Having thus described the invention by providing specific examples thereof, it is to be understood that no undue limitations or restrictions are to be drawn by reason thereof and that many modifications and variations are within the scope of the invention.

We claim:

1. A process for the preparation of finely sub-divided hydrogenated rubbery polymer which comprises dissolving a hydrogenated polymer selected from the group consisting of homopolymers of dienes and copolymers of styrene and butadiene, containing not more than about 30 parts of styrene by weight in a solvent, emulsifying the resulting solution with water and an oil-soluble emulsifying agent at a temperature below the softening point of the rubbery polymer, vaporizing the solvent from the emulsion at a temperature below the softening point of the rubbery polymer and introducing the emulsion into a water-soluble polar organic precipitating agent selected from the group consisting of pyridine, alkyl amines, alkyl alcohols and alkyl ketones in which the alkyl group contains not more than five carbon atoms, with a minimum of agitation whereby finely sub-divided polymer is obtained.

2. The process of claim 1 in which the hydrogenated rubbery polymer is a hydrogenated polybutadiene.

3. The process of claim 1 in which the hydrogenated rubbery polymer is a hydrogenated copolymer of styrene and butadiene containing not more than about 30 parts of styrene by weight.

4. A process for the preparation of finely sub-divided hydrogenated rubbery polymer which comprises dissolving a hydrogenated polymer selected from the group consisting of homopolymers of dienes and copolymers of styrene and butadiene, containing not more than about 30 parts of styrene by weight in a solvent, emulsifying the resulting solution with water and an oil-soluble emulsifying agent at a temperature below the softening point of the rubbery polymer, vaporizing the solvent from the emulsion at a temperature below the softening point of the rubbery polymer and introducing the emulsion onto the surface of a water-soluble polar organic precipitating agent selected from the group consisting of pyridine, alkyl amines, alkyl alcohols and alkyl ketones in which the alkyl group contains not more than five carbon atoms, with a minimum of agitation whereby finely sub-divided polymer is obtained.

5. The process of claim 4 in which the hydrogenated rubbery polymer is hydrogenated polybutadiene.

6. The process of claim 4 in which the hydrogenated rubbery polymer is a hydrogenated copolymer of butadiene and styrene containing not more than about 30 parts of styrene by weight.

7. A process for the preparation of finely sub-divided hydrogenated polybutadiene polymer containing from 0 to 50 percent unsaturation which comprises dissolving said polymer in a solvent, emulsifying the resulting solution with water in an amount comprising at least 30 percent by weight of the solution of said polymer and an oil soluble emulsifying agent at a temperature below the softening point of said polymer, vaporizing the solvent from the emulsion at a temperature below the softening point of said polymer and introducing the emulsion into a water-soluble polar organic precipitating agent present in an amount equal to between about 5 and about 10 times the weight of the water present in said emulsion, said precipitating agent being selected from the group consisting of pyridine, alkyl amines, alkyl alcohols and alkyl ketones the alkyl group containing not more than 5 carbon atoms, with a minimum of agitation whereby finely sub-divided polymer is obtained.

8. A process for the preparation of finely sub-divided hydrogenated polybutadiene polymer containing from 0 to 50 percent unsaturation which comprises dissolving said polymer in a solvent, emulsifying the resulting solution with water in an amount comprising at least 30 percent by weight of the solution of said polymer and an oil soluble emulsifying agent at a temperature below the softening point of said polymer, vaporizing the solvent from the emulsion at a temperature below the softening point of said polymer and introducing the emulsion onto the surface of a water soluble polar organic precipitating agent present in an amount equal to between about 5 and about 10 times the weight of the water present in said emulsion, said precipitating agent being selected from the group consisting of pyridine, alkyl amines, alkyl alcohols and alkyl ketones the alkyl group containing not more than 5 carbon atoms, with a minimum of agitation whereby finely sub-divided polymer is obtained.

9. The process of claim 8 in which the precipitating agent is methanol.

10. The process of claim 8 in which the precipitating agent is acetone.

No references cited.